US012695712B2

(12) United States Patent
  Yoshino

(10) Patent No.:    US 12,695,712 B2
(45) Date of Patent:        Jul. 28, 2026

(54) SWITCH CONFIGURATION, NETWORK SYSTEM AND CONTROL METHOD

(71) Applicant: NTT, Inc., Tokyo (JP)

(72) Inventor: Manabu Yoshino, Musashino (JP)

(73) Assignee: NTT, Inc., Tokyo (JP)

( * ) Notice: Subject to any disclaimer, the term of this patent is extended or adjusted under 35 U.S.C. 154(b) by 570 days.

(21) Appl. No.: 18/017,985

(22) PCT Filed: Jul. 28, 2020

(86) PCT No.: PCT/JP2020/028870
  § 371 (c)(1),
  (2) Date: Jan. 25, 2023

(87) PCT Pub. No.: WO2022/024215
  PCT Pub. Date: Feb. 3, 2022

(65) Prior Publication Data
  US 2023/0283576 A1    Sep. 7, 2023

(51) Int. Cl.
  *H04M 3/00*      (2024.01)
  *H04L 12/44*     (2006.01)
  *H04L 12/66*     (2006.01)
  *H04L 49/35*     (2022.01)
  *H04M 5/00*      (2006.01)
(52) U.S. Cl.
  CPC .............. *H04L 49/35* (2013.01); *H04L 12/44* (2013.01)
(58) Field of Classification Search
  CPC ......... H04L 45/28; H04L 41/12; H04L 41/08; H04L 43/081; H04L 49/00; H04L 49/1523; H04L 41/122; H04L 41/0897; H04L 41/0895; H04L 49/15; H04L 49/1515;
  (Continued)

(56) References Cited

U.S. PATENT DOCUMENTS 8,325,726 B2 *  12/2012  Baban ..................... H04L 49/10
                                                       370/432
8,902,780 B1 *  12/2014  Hegde ..................... H04L 45/70
                                                       370/252
  (Continued)

FOREIGN PATENT DOCUMENTS

JP        2006-157281 A     6/2006
JP        2008-072708 A     3/2008

OTHER PUBLICATIONS

T. Mano et al., "Increasing Capacity of the Clos Structure for Optical Switching Networks", 2019 IEEE Global Communications Conference (GLOBECOM), 2019.

*Primary Examiner* — Kharye Pope
(74) *Attorney, Agent, or Firm* — Harness, Dickey & Pierce, P.L.C.

(57)        ABSTRACT

There is provided a switch configuration including one or more first layer switches having first ports and second ports and one or more second layer switches, some of the first ports are connected to the second ports connected to the second layer switches, the second ports connected to the second layer switches are connected to the ports of the second layer switches, the ports of the second layer switches connected to the first layer switches are connected to the ports of the second layer switches connected to the first layer switches, and at least one of the second ports connected to the first ports and the ports of the second layer switches connected to the first layer switches are connected to a relay network.

5 Claims, 7 Drawing Sheets

(58) Field of Classification Search
CPC ..... H04L 49/25; H04L 45/24; H04L 49/1569;
H04Q 3/68; H04Q 11/0005
See application file for complete search history.

(56)                References Cited

U.S. PATENT DOCUMENTS

| | | | | |
|---|---|---|---|---|
| 8,953,605 B1 * | 2/2015 | Mehra | .................... | H04L 45/02 |
| | | | | 370/392 |
| 10,951,527 B2 * | 3/2021 | Srivastava | ............. | H04L 49/25 |
| 10,965,586 B2 * | 3/2021 | Goel | .................... | H04L 45/028 |
| 2008/0044181 A1 * | 2/2008 | Sindhu | .............. | H04Q 11/0005 |
| | | | | 398/45 |
| 2008/0062864 A1 | 3/2008 | Balasubramanian et al. | | |
| 2008/0151863 A1 * | 6/2008 | Lawrence | .............. | H04L 49/15 |
| | | | | 370/386 |
| 2016/0241430 A1 * | 8/2016 | Yadav | .................. | H04L 49/557 |
| 2021/0019131 A1 * | 1/2021 | Tulsian | .................... | G06F 8/63 |

* cited by examiner

START

ACQUIRE COMMUNICATION SOURCE INFORMATION
COMMUNICATION DESTINATION INFORMATION (AFTER MAKING
CONNECTION RELATION THAT CAN BE
ACQUIRED IN CASE OF ACQUISITION BY SIGNAL)    S101

DETERMINE ROUTE    S102

PROVIDE INSTRUCTION    S103

CHANGE CONNECTION RELATION    S104

OUTPUT SIGNAL    S105

END

SWITCH CONFIGURATION, NETWORK SYSTEM AND CONTROL METHOD

CROSS-REFERENCE TO RELATED APPLICATIONS

This application is a 371 U.S. National Phase of International Application No. PCT/JP2020/028870, filed on Jul. 28, 2020. The entire disclosure of the above application is incorporated herein by reference.

TECHNICAL FIELD

The present invention relates to a switch configuration, a network system and a control method.

BACKGROUND ART

A communication network such as an optical fiber network or a telephone network is provided with a plurality of network devices. One of the network devices provided in the communication network is a switch. A switch, which is one of the network devices, is used to switch a communication destination in response to a request of a subscriber of a communication network or the like.

One configuration of such a switch is a configuration called a Clos network which is a nonblocking network, and a plurality of configurations belonging to the Clos network have been proposed. One is a configuration in which a symmetric switch is used for an input/output switch (input/output SW, input-output switch: IOSW), which is a switch connected to a subscriber's terminal, for example. However, such a configuration has a problem that a subscriber side port, which is a port of a subscriber side of the input/output switch, is left over.

For this, it has been proposed to virtually divide the input/output switch into two switches whose number of subscriber side ports is N and whose number of intermediate layer switch side ports is M (N<M) for a target switch of $(N+M+O1)\times(M+N+O2)$ (see NPL 1). The intermediate layer switch side port is a port which is connected to an intermediate layer switch (intermediate layer SW) instead of the subscriber's terminal among the ports provided in the input/output SW. Note that O1 and O2 are the numbers of remaining ports not allocated to N and M, and are integers of 0 or more.

CITATION LIST

Non Patent Literature

[NPL 1] T. Mano, T. Inoue, K. Mizutani and O. Akashi, "Increasing Capacity of the Clos Structure for Optical Switching Networks", 2019 IEEE Global Communications Conference (GLOBECOM)

SUMMARY OF INVENTION

Technical Problem

The Clos network which is a prerequisite for the above-mentioned related art (NPL 1) is a full return network that uses a route of the input/output switch-the intermediate layer switch-the input/output switch.

In a case where the Clos network is used and some of the switches are connected to a network outside the Clos network, for example, a relay network, it is conceivable to connect some of the subscriber side ports of the input/output switch to the relay network instead of the subscriber's device. However, regarding the connection of a relay network, the selectivity of a Clos network which can select any subscriber's device and connect it without blocking is an excessive specification. That is, in the case of a Clos network in which some of switches are connected to the relay network instead of the full return network, the efficiency of the use of the switch may be low.

In view of the above circumstances, it is an object of the present invention to provide a technique for improving the efficiency of the use of a switch in a network having a configuration in which at least some switches are connected to a relay network.

Solution to Problem

A switch configuration comprising:
one or more first layer switches each having first ports and second ports, and one or more second layer switches each having at least one port connected to a first layer switch,
    wherein ports of a second layer switch connected to a first layer switch is connected to other ports of the second layer switch connected to the first layer switch, and
at least one of second ports connected to a first port of the first layer switch or one of ports of the second layer switch connected to a first layer switch is connected to a relay network.

Advantageous Effects of Invention

According to the present invention, it is possible to provide a technique for improving the efficiency of the use of switches in a network having a configuration in which at least partial ports of the switches connected to a relay network.

DESCRIPTION OF EMBODIMENTS

First Embodiment

Figure 1:
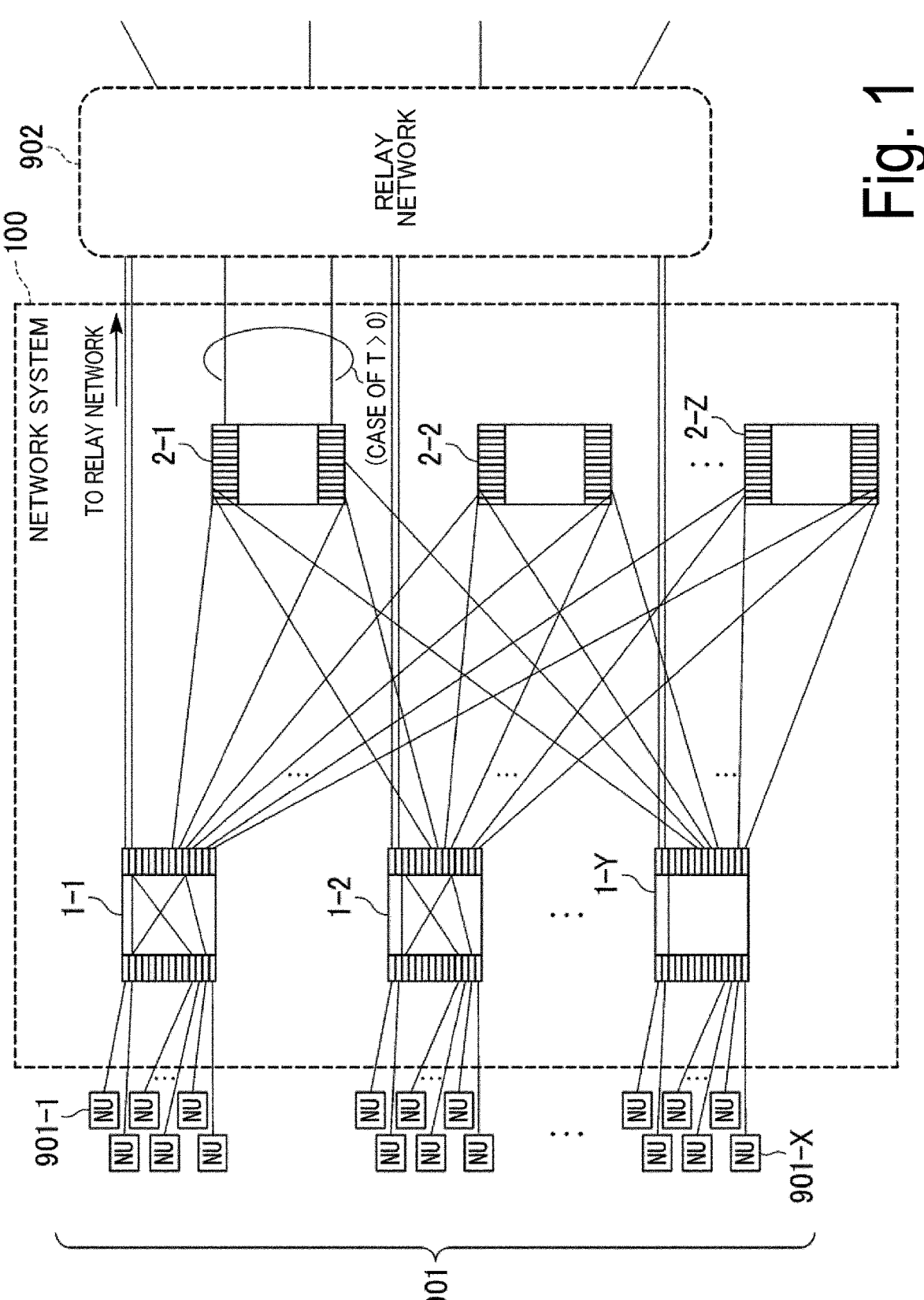
FIG. 1 is a diagram showing an example of a configuration of a network system 100 according to a first embodiment.

FIG. 1 is a diagram showing a configuration of a network system 100 according to a first embodiment. The network system 100 includes Clos network in part of its configuration.

The network system 100 includes first layer switches 1-1 to 1-Y (Y is a natural number), which correspond to an input/output switch of Clos network, and second layer switches 2-1 to 2-Z (Z is a natural number), which correspond to an intermediate layer switch of a Clos network. For the sake of simplicity of the following description, the upstream communication in which a communication signal is transmitted from a subscriber device will be described in the description of the network system 100, but the same applies to the downstream (that is, the reverse direction) communication. This is the same for network systems 100*a*, 100*b*, 100*c*, and 100*d* to be described later.

Each of the first layer switches 1-1 to 1-Y is a switch. A switch is a network device having a plurality of first input ports and a plurality of second ports, which output signals input to a certain ports to other ports corresponding to the signals, and output and input signals inputs to and output from first ports from and to a second ports corresponding to the signals.

Each of the first layer switches 1-1 to 1-Y is a system having ports, is a system composed of an optical circuit such as an optical waveguide if it is an optical switch and an electric circuit such as an electric element or the like if it is an electric switch between the ports, and has a system for transmitting communication signals (hereinafter referred to as an "internal transmission system"). The ports of each of the first layer switches 1-1 to 1-Y to which the communication signals input to the ports are to be transmitted are changed by the control of the control device 4 to be described later.

Taking the case where the internal transmission system is an optical waveguide as an example, an output port serving as a transmission destination may be set by changing the physical property value of part of the optical waveguide by applying voltage or current or controlling temperature by electricity. The output port may be set according to the generation of optical non-linear effects such as four-wave mixing, or a change in intensity or the refractive index of a provided gain medium, may be set according to a change in reflectance, reflection angle, or polarization states of provided optical components such as micro electro mechanical systems (MEMS), liquid crystal on silicon (LCOS), or the like, or may be set by physically connecting a transmission line and a transmission line. This is the same below.

Each of the first layer switches 1-1 to 1-Y is connected to one or more subscriber terminals 901 via the first ports. In FIG. 1, a total of X subscriber terminals 901 of the subscriber terminals 901-1 to 901-X are connected to any one of the first layer switches 1-1 to 1-Y. Note that the subscriber terminals 901-1 to 901 to X are not included in the network system 100 of the present invention.

The subscriber terminal 901 is a terminal (that is, a subscriber terminal) used by a user (that is, a subscriber) of the network system 100. The subscriber terminal 901 is, for example, a personal computer. Note that the connection between the device and the device means that the device and the device can communicate with each other via wired communication paths such as optical fibers or telephone lines or wirelessly. The device to be connected is, for example, a subscriber terminal or a network device.

Instead of the subscriber terminal 901, the connection destination of the first layer switches 1-1 to 1-Y may be communication devices such as termination devices (optical network units (ONUs)) or set top boxes (STBs) used when the subscriber terminals 901 connect to the network system or a combination thereof. In the case of the termination devices, STBs, or combination thereof, they may be included in the network system. The subscriber terminal 901 may be, for example, a broadcast source for broadcasting or a distribution source of video distribution or the like.

The subscriber terminal 901 transmits and receives a communication signal to and from the network system 100. The communication signal is a signal representing communication information. The communication information is information to be transmitted to a communication destination. The communication destination is a device of a transmission destination of communication information. The communication information may include either information indicating the subscriber terminal 901 that is a transmission source of the communication information (hereinafter referred to as "communication source information") or information indicating the communication destination (hereinafter referred to as "communication destination intonation").

The communication source information need not be a name of a transmission source, and may be a time slot in a frame, or may be information indicating a broadcast source and a distribution source of broadcasting and distribution, not limited to the subscriber terminal 901. The communication destination information need not be a name of a communication destination, and may be a time slot in a frame. Alternatively, they may be a path identifier such as a virtual local area network (ULAN) identifier (ID) or a Virtual Extensible Local Area Network (Vxlan) network identifier (VNI).

Hereinafter, the case where the subscriber terminal transmits data will be described. The communication signal transmitted from the subscriber terminal 901 to the network system 100 is input to any of the ports of the first layer switches 1-1 to 1-Y (referred to as a first port).

Each of the first layer switches 1-1 to 1-Y is connected to a relay network 902 via a port (referred to as a second port). The relay network 902 is an external network of the network system 100. The external network includes one or more network devices. Therefore, being connected to the relay network 902 means, more specifically, being connected to any of a plurality of network devices provided in the relay network 902.

Each of the first layer switches 1-1 to 1-Y is connected to the second layer switches 2-1 to 2-Z via the second ports which are not connected to the relay network 902.

Each of the second layer switches 2-1 to 2-Z is a switch. The second layer switches 2-1 to 2-Z are connected to the first layer switches 1- 1 to 1-Y or the relay network via the ports. That is, at least some of the ports of the second layer switches 2-1 to 2-Z are connected to the first layer switches 1-1 to 1-Y. The connection between ports and ports means that signals input to one port can be transmitted to other port.

Each of the second layer switches 2-1 to 2-Z has an internal transmission system like the first layer switch 1. Further, the ports of each of the second layer switches 2-1 to 2-Z to which the communication signals input to the ports is to be transmitted are changed by the control of the control device 4 to be described later, in the same manner as the first layer switch 1.

Hereinafter, when the first layer switches 1-1 to 1-Y are not distinguished, they are referred to as the first layer switch 1. Hereinafter, when the second layer switches 2-1 to 2-Z are not distinguished, they are referred to as the second layer switch 2.

The first layer switch 1 has R ports on one side, and 2R ports in total. R is a natural number, which is the same value as $(K+N+L_1)$ and also the same value as $(K+MZ\ 30\ L_2)$. K is the maximum number of first ports connected to the second port directly connected to the relay network from the first layer switch, and is a non-negative integer. N is the maximum number of first ports connected to the second port connected to the second layer switch from the first layer switch, and is a natural number.

In terms of management, it is easy to employ a configuration in which the N first ports of the first layer switch connected to the subscriber devices and the K first ports of the first layer switch connected to the subscriber devices are arbitrarily connected to the seconds port connected to the second layer switches and the second ports connected to the relay network without distinction.

However, there is nothing stopping N from being 1 in at least some the first layer switches. Z is the maximum number of second layer switches that can be connected, and is a non-negative integer. M is the maximum number of second ports connected to ports on one side of one second layer switch from one first layer switch, and is a natural number. $L_1$ and $L_2$ are the numbers of unallocated ports, and are non-negative integers.

The second layer switch 2 has $(S+T+L_s)$ ports on one side. S is a natural number, and is equal to the sum of the number M of ports connected to one first layer switch 1 from one side of the second layer switch, that is, MY. T is the maximum number of ports directly connected to the relay network, and is a non-negative integer. $L_s$ is a non-negative integer. When K is negative and T is non-negative, the maximum number of subscriber devices that are directly connected to the relay network from the second layer switch with one first layer switch 1 is T to 2T, and accordingly, the number of ports that are back-connected between the subscriber devices is N−T to N−2T. Note that K and T are not zero at the same time.

The connection between the port N of the first layer switch and the port M of the second layer switch is the connection of the Clos network. That is, when the first layer switch has a maximum of Y units and the second layer switch has a maximum of ZY units, $2[(n-1)/m]+1 \leq Z$ is satisfied. Here, [ ] is a Gaussian symbol, and the number of ports of the first port of the first layer switch≥N+K, the number of ports of the second port of the first switch≥MZ+K, and the number of ports on one side of the second switch≥MY+T.

Here, as shown in the drawing, it is assumed that the opposite ports of the second layer switch are connected to the relay network in units of sets. When connection is made in units of sets, a first layer switch requires routes for a set of a subscriber device-a first layer switch-a second layer switch-a first layer switch-a subscriber device per set. Therefore, the first layer switch can be replaced and calculated in tams of the accommodation design of first layer switches. Meanwhile, in second layer switches, the number of ports directly connected to the relay network of the set is increased by two, and the connection in second layer switches is increased by one as compared with the case where the connections from the second ports of the first layer switch are connected to each other.

Further, the number of ports connected to the relay network may not be the same on one side of the second layer switch so as to foam a set, and the number of opposite sides may be asymmetric. In this case, it is calculated that first layer switches are provided with a half of the routes in tams of the accommodation design of first layer switches. Further, when first layer switches are connected to the maximum number of second layer switches, that is, one first layer switch is connected to one port on one side of one intermediate layer switch, M is a natural number of $(2 \times (N-1))$ or more. The following effects will be described by way of this connection.

The network system 100 of the first embodiment configured as described above includes a first layer switch 1 having a configuration in which K ports and K ports are added to a switch having N ports and M ports, respectively. The first layer switch 1 is not a combination of an N×M switch and a K×K switch, but an (N+K)×(M×K) switch.

Similarly, the network system includes a second layer switch 2 having a configuration in which T ports and T ports are added to a switch having S ports and MS ports, respectively. The second layer switch 2 is not a combination of an S×S switch and a T×T switch, but an (S+T)×(S×T) switch.

The efficiency of the use of the switches is evaluated by the number of connectable subscribers to the number of ports of the switch. The configuration in which K is non-zero, T is zero, and input/output switches are connected to the maximum number of intermediate layer switches is taken as an example.

When the subscriber side port of the conventional Clos network is connected to the relay network, the efficiency of the switches is (N/M), that is, ((M/2+1)/M). On the other hand, in the network system 100, the efficiency thereof is ((M/2+1+K)/(M+K)). ((M/2+1+K)/(M+K)) is larger than ((M/2+1)/M). Thus, the network system 100 can improve the efficiency of the use of the switch more than that of the conventional network system.

Next, the configuration in which K is zero and T is non-zero is taken as an example. In the second layer switch of the route of the subscriber device-the first layer switch-the second layer switch-the first layer switch-the relay network, instead of connecting a port to the preceding first layer switch and a port to the subsequent second layer switch, ports to the preceding and subsequent first layer switches are each connected to ports to the relay network. That is, when the number of first ports of the same number of first layer switches is compared, the number of ports to the relay network is twice as many.

In tams of the number of intra-switch port connections in a network, conventionally, there are a total of three connections of the first layer switch 2 connection and the second layer switch 2 connection per port to the relay network. This example is ⅔ of a total of two connections of the first layer switch 1 connection and the second layer switch 2 connection, that is, the efficiency is 1.5 times.

The network system 100 of the first embodiment can improve the efficiency of the use of the switches in a situation where the size of the switches can be increased.

Further, the network system 100 uses the Clos network to co-accommodate the return with the relay network 902. Although the configuration of the network system 100 can be designed by a user according to the accommodation design, at least part of the network system 100 does not pass through the route of the first layer switch 1-the second layer switch 2-the second layer switch, or is directly connected to the relay network 902 without passing through the second layer switch 2.

Therefore, the network system 100 can improve the efficiency as a network by the amount of direct connection to the relay network 902. This is the same for the network systems 100a, 100b, 100c, and 100d to be described later.

The fact that the relay network 902 and the second layer switch 2 may be directly connected is the same for the network systems 100a, 100b, 100c, and 100d to be described later.

Here, the effects of the network system 100 will be further described. The network system 100 does not need to connect to specific ports among the ports to the relay network 902. This means that any first layer switches 1 are connected to any second layer switches 2 in the same manner, and a situation of the port of the second layer switches 2 and the already connected ports of the second layer switches 2 is the same as the connection of the ports to the second layer switches 2 when the situation is the same. Further, it means that any ports to the relay network 902 may be selected in the same manner as the case where there is no difference even in the case where any ports to the second layer switches 2 are selected.

Incidentally, in the related art, regarding the connection of the ports directly connected to the relay network 902, the selectivity of Clos which can select any ports directly connected to the relay network 902 and any subscriber and connect them without blocking was an excessive specification. In view of an appropriate specification which is not excessive, the selectivity of being able to connect to any of the port groups directly connected to the relay network 902 is sufficient.

According to the related art, it is necessary to select routes that propagate from the first layer switches 1 to the second layer switches 2 and propagate from the second layer switches 2 to the first layer switches 1. However, paying attention to the above selectivity, it is not necessary for at least some ports to the relay network 902 to select routes that propagate from the first layer switches 1 to the second layer switches 2 and propagate from the second layer switches 2 to the first layer switches 1.

For example, in the network system 100, the first layer switches 1 of the first stage are directly connected to ports to the relay network 902, but this connections are only the connections in the first layer switches 1 of the first stage. Therefore, in the case of the network system 100, the connections are one-third as compared with the related art. This is the same for the network systems 100*a*, 100*b*, 100*c*, and 100*d* to be described later.

When the second layer switches 2 are connected to the ports of the relay network 902, the first layer switches 1 of the first stage and the second layer switches 2 of the second stage are sufficient. Therefore, in the case of the network system 100, the connections are two-thirds as compared with the related art. This is the same for the network systems 100*a*, 100*b*, 100*c*, and 100*d* to be described later.

<Control>

Here, the control of the network system 100 will be described. The routes of the communication signals input to the network system 100 are controlled by the control device 4. Specifically, the control device 4 executes route determination processing. The route determination processing includes processing for determining output ports (hereinafter referred to as "final ports") in which communication signals input to the network system 100 are output to external devices of the network system 100. The route determination processing includes processing for determining propagation routes of communication signals from being input to the network system 100 to reaching the final ports.

The control device 4 may be included in the network system 100 or may be a device installed outside the network system 100. The description of the control of the network system 100 is the same for the network systems 100*a*, 100*b*, 100*c*, and 100*d* to be described later. Here, the control device 4 will be described more specifically by taking the network system 100 as a specific example.

Figure 2:
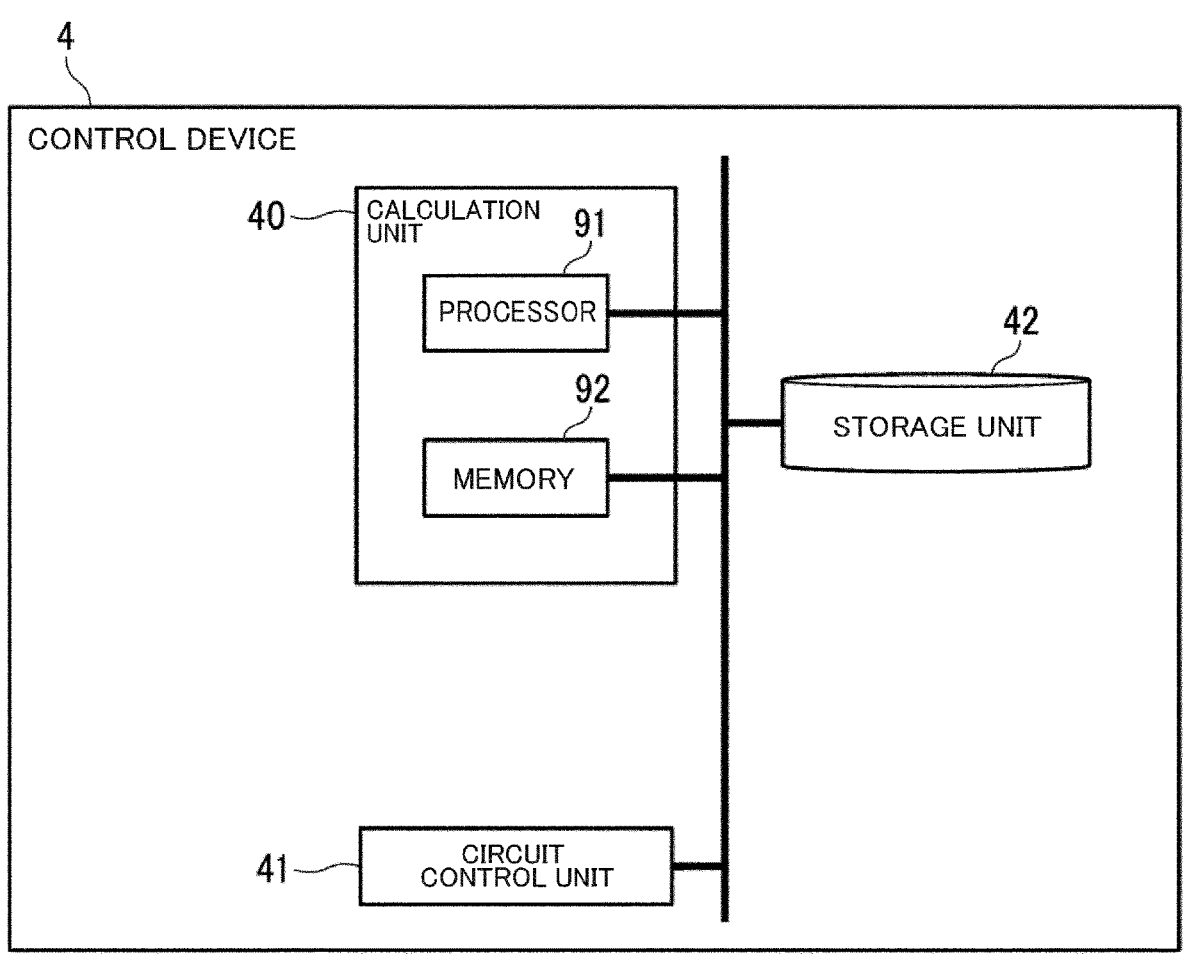
FIG. 2 is a diagram showing an example of a hardware configuration of a control device 4 in the first embodiment.

FIG. 2 is a diagram showing an example of a hardware configuration of the control device 4 in the first embodiment. The control device 4 includes a calculation unit 40 including a processor 91 such as a central processing unit (CPU) and a memory 92, which are connected by a bus, and executes a program. The control device 4 functions as a device including the calculation unit 40, a circuit control unit 41, and a storage unit 42 by executing a program.

More specifically, the processor 91 reads the program stored in the storage unit 42, and stores the read program in the memory 92. When the processor 91 executes the program stored in the memory 92, the control device 4 functions as a device including the calculation unit 40, the circuit control unit 41, and the storage unit 42.

The calculation unit 40 controls the operation of various functional units provided in the control device 4. The calculation unit 40 executes route determination processing for, for example, a communication signal input to the network system 100. The calculation unit 40 controls the operation of the first layer switches 1 and the second layer switches 2 provided in the network system 100 so that the communication signals propagate through the routes determined by the route determination processing, via the control of the circuit control unit 41. The control of the operation of the first layer switches 1 and the second layer switches 2 means the control of each internal transmission system provided in the first layer switch 1 and the second layer switch 2.

Specifically, the calculation unit 40 instructs the circuit control unit 41 to control the first layer switches 1 and the second layer switches 2 so that the communication signals are propagated through the determined routes. The circuit control unit 41 controls the first layer switches 1 and the second layer switches 2 according to the instruction from the calculation unit 40. Thus, the communication signals propagate through the routes determined by the calculation unit 40.

The circuit control unit 41 controls the operation of the first layer switches 1 and the second layer switches 2. The circuit control unit 41 includes an element for acquiring at least part of a communication signals input to an internal transmission system such as a Photodetector.

Here, it is assumed that a subscriber device, a termination device, an STB, or the like transmits information on a communication source, a communication destination, and a path to a network system, or includes information on a communication source, a communication destination, and a path in the communication information, and the information is acquired. The circuit control unit 41 outputs part of the acquired communication signals to the calculation unit 40.

The circuit control unit 41 includes a connection relation control element. The connection relation control element is an element for controlling a circuit for transmitting a communication signal (that is, an internal transmission system), which changes the connections relation between ports and ports. The connection relation control element is an element for changing the physical property value of a transmission line provided in an internal transmission system such as a piezoelectric element or a heating element. When pressure and heat are applied to the internal transmission system by such an element, the connection relation between the port and the port changes. The connection relation control element is controlled based on an instruction of the calculation unit 40.

The storage unit 42 is configured by using a non-transitory computer-readable storage medium device such as a magnetic hard disk device or a semiconductor storage device. The storage unit 42 stores various information about the control device 4 and the network system 100. The storage unit 42 stores, for example, information indicating a rule for determining the route of the communication signal input to the network system 100 (hereinafter referred to as a "route determination rule"). The storage unit 42 stores, for example, a program that determines a route based on a route determination rule (that is, a program that executes route determination processing).

Here, an example of the control executed by the control device 4 will be described. In particular, a case where the communication signal includes the communication source information and the communication destination information at the beginning of the communication start will be described as an example. However, the control device 4 can also perform control based on at least one of the communication source information and the communication destination information, and it is not always necessary to pertain control using the communication source information and the communication destination information as in the example described below. The communication signal may include the communication source information and the communication destination information even after the communication is started.

In the control executed by the control device 4, for example, correspondence intonation is used. The correspondence intonation is information in which combinations of the ports of each of the first layer switches 1 and the ports of each of the second layer switches 2 are associated with each other for each communication destination. The correspondence information is information stored in advance, for example, the storage unit 42 stores it in advance.

Figure 3:
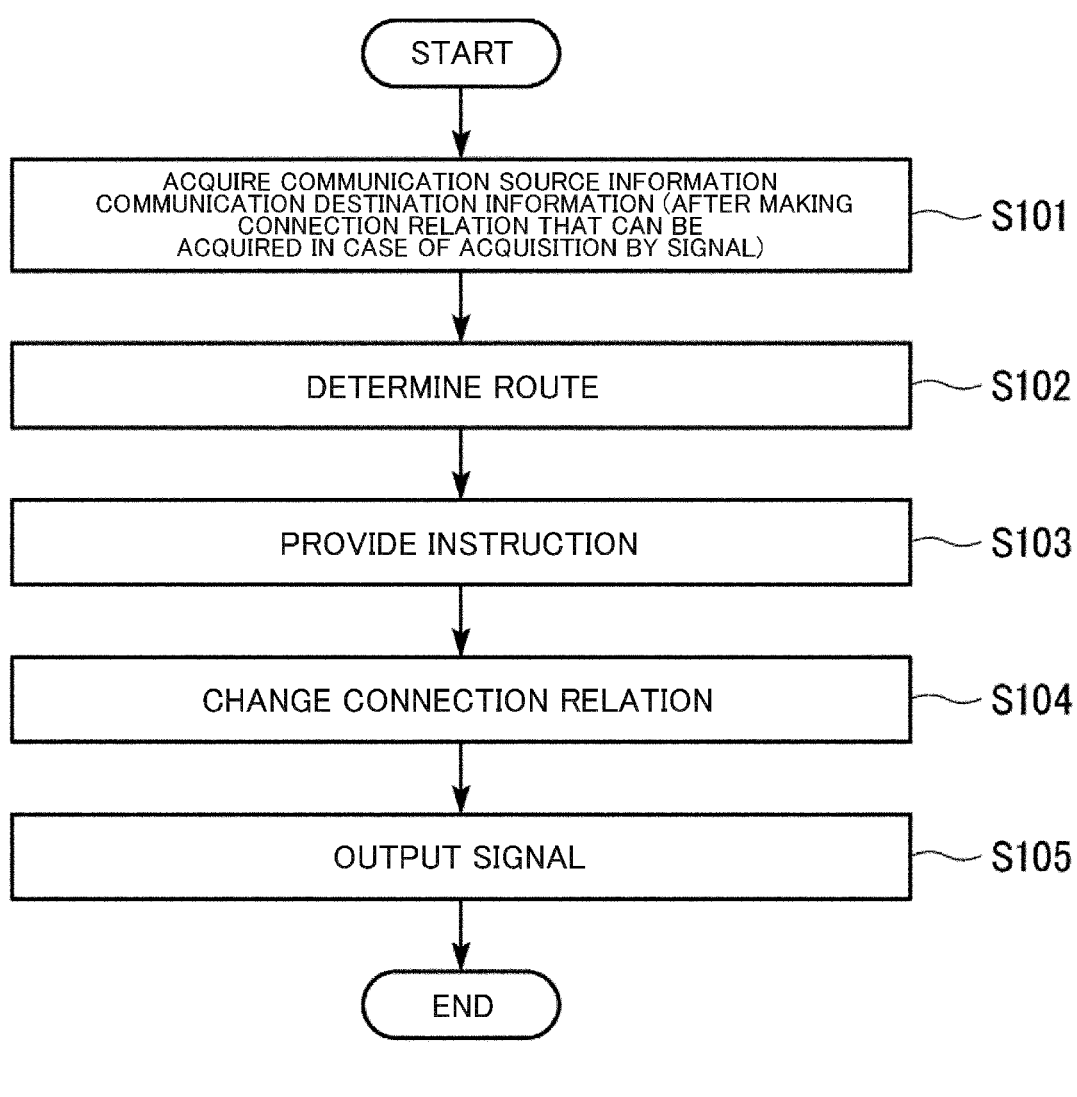
FIG. 3 is a flowchart showing an example of a flow of processing executed by the network system 100 according to the first embodiment.

FIG. 3 is a flowchart showing an example of a flow of processing executed by the network system 100 according to the first embodiment. This flowchart is the same for the network systems 100a, 100b, 100c, and 100d to be described later.

The calculation unit 40 first acquires at least one of communication source intonation, communication destination information, and path information indicated by communication signals input to the network system 100 via the circuit control unit 41 (step S101). Although not described, in order to acquire at least one of communication source information, communication destination information, and path information indicated by a communication signal input to the network system 100 via the circuit control unit 41 by using the communication signal from the subscriber device, it may be acquired after setting the ports and the routes so that the subscriber device and the circuit control unit 41 can transmit and receive the communication signals, and at least the circuit control unit 41 can receive the communication signals through the same steps as in steps S104 and S105.

The circuit control unit 41 outputs the acquired communication source information and communication destination information to the calculation unit 40. In such a case, the element is provided at a position where it can be output to the circuit control unit 41 or the calculation unit 40 via a control line such as a BUS such as a transmission circuit. In such a case, the internal transmission system is a system which is routed so that a signal required for control arrives at the element.

Next, the calculation unit 40 determines each port and a port corresponding to the communication destination indicated by the information based on the correspondence information (step S102). That is, this processing includes processing for determining a port and processing for determining a route. Then, the calculation unit 40 generates a transmission control signal so that the communication signal is transmitted through the determined route (step S103). The transmission control signal is a specific example of an instruction to the circuit control unit 41.

Next, the circuit control unit 41 changes the connection relation between the input port and the output port for each of the first layer switches 1 and the second layer switches 2 by a connection relation control element based on the transmission control signal (step S104). As a result of the processing in step S104, the communication signal propagates through the route determined in step S102, and is output from the final port determined in step S102 (step S105).

Second Embodiment

Figure 4:
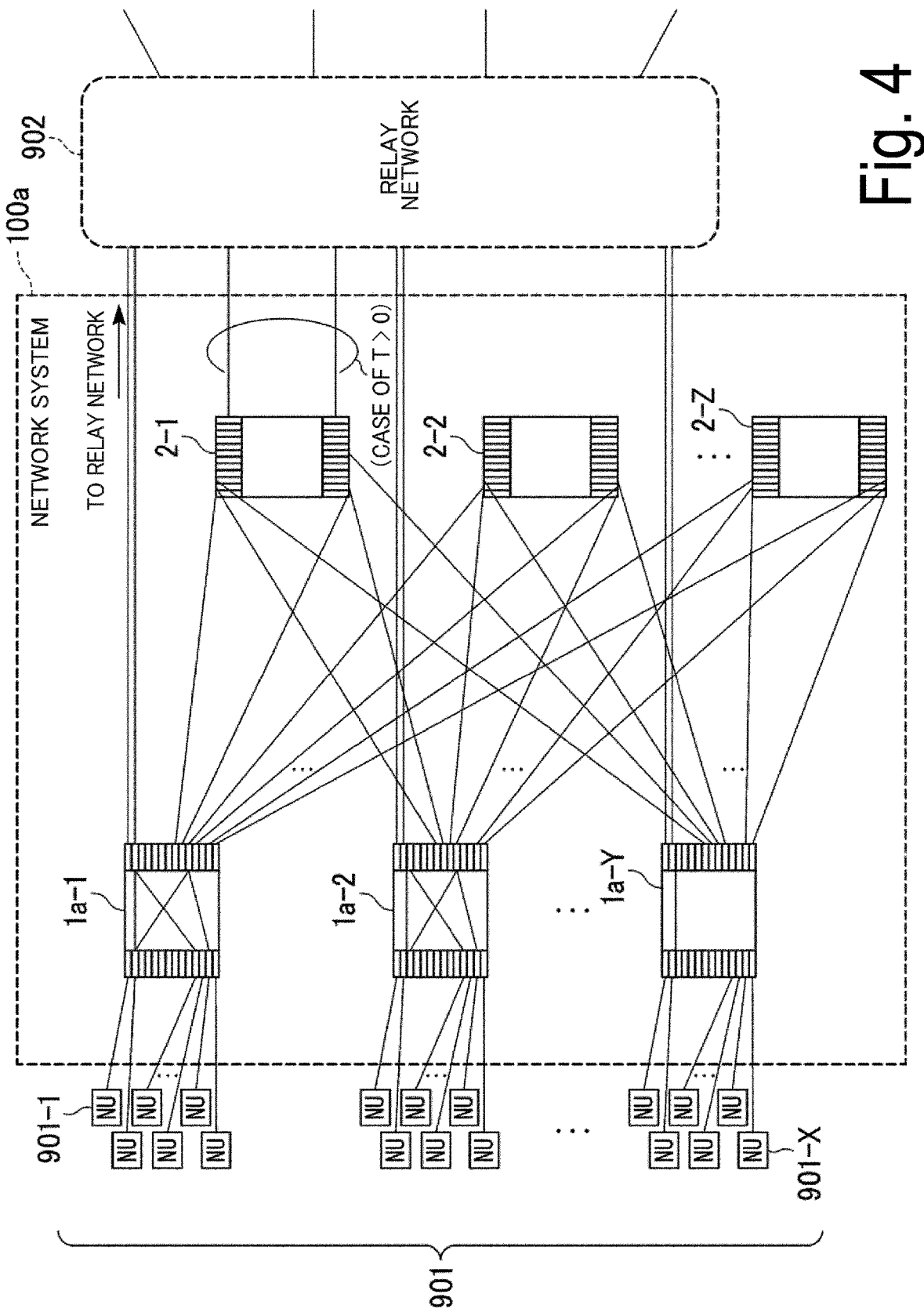
FIG. 4 is a diagram showing a configuration of a network system 100a according to a second embodiment.

FIG. 4 is a diagram showing an example of a configuration of a network system 100a according to a second embodiment. The network system 100a includes Clos network in part of its configuration.

The network system 100a is different from the network system 100 in that first layer switches 1a-1 to 1a-Y are provided instead of the first layer switches 1-1 to 1-Y. It is the same that at least one of K and T is non-negative.

Each of the first layer switches 1a-1 to 1a-Y is a switch. The switch is a network device having a plurality of first ports and a plurality of second ports, which outputs signals input to and output from the first ports to the second ports corresponding to the signals.

Each of the first layer switches 1a-1 to 1a-Y is connected to one or more subscriber terminals 901 via the first ports. In FIG. 4, a total of X subscriber terminals 901 of the subscriber terminals 901-1 to 901-X are connected to any one of the first layer switches 1a-1 to 1a-Y.

Hereinafter, the case where the subscriber terminal transmits data will be described. The subscriber terminal 901 transmits a communication signal to the network system 100a, and the communication signal transmitted from the subscriber terminal 901 to the network system 100a is input to any one of the first ports of the first layer switches 1a-1 to 1a-Y.

Each of the first layer switches 1a-1 to 1a-Y is connected to the relay network 902 via part of their second ports.

Each of the first layer switches 1a-1 to 1a-Y is connected to the second layer switches 2-1 to 2-Z via their second ports which are not connected to the relay network 902. Therefore, at least some of the ports of the second layer switches 2-1 to 2-Z are connected to the first layer switches 1a-1 to 1a-Y.

Each of the first layer switches 1a-1 to 1a-Y has an internal transmission system like the first layer switch 1. The port of the transmission destination of the communication signal input to each port is changed by the control of the control device 4 in the same manner as the first layer switch 1.

Hereinafter, when each of the first layer switches 1a-1 to 1a-Y is not distinguished, it is referred to as the first layer switch 1a.

The first layer switch 1a is different from the first layer switch 1 in that the configuration of the port provided is different. The first layer switch 1a has R ports on one side.

First, an ordinary Clos network is configured. Next, the case where K is non-negative and T is zero will be described. After the configuration, the first layer switch 1a selects K ports from the M second ports connected to the second layer switch as the ports to the relay network, and connects the selected ports to the relay network. The corresponding number of K ports are set from the first port. A value obtained by subtracting K from M is set as new M, and N corresponding to the new M is set as new N.

Alternatively, the first layer switch 1a selects K ports from the first port, and when the number obtained by subtracting K from R is less than N, a value obtained by subtracting N from the number that is less than N is set as new N, and M corresponding to the new N is set as new M, and when the number is equal to or more than N, N and M are used as they are.

Next, the case where K is zero and T is non-negative will be described. After an ordinary Clos network is configured, in some connections in the second layer switches 2*a,* instead of connecting the first layer switches 1*a* and the first layer switches 1*a,* each is connected to the relay network. In a case where there is room to add T ports connected to the relay network on one side of the ports of the second layer switches 2*a,* they are added as they are, and in a case where there is not enough room to add T ports thereto, M is subtracted by that amount, the subtracted M is set as new M, N corresponding to the new M is set as new N, and T ports connected to the relay network are added to one side of the ports of the second layer switches 2*a.*

In either case, when the value of M decreases, the value obtained by multiplying the number M of connections for each first layer switch 1*a* in the second layer switch 2*a* by the number Y of first layer switches 1*a* decreases, so that the number of first layer switches 1*a* may be increased by that amount.

Both K and T may be non-negative.

The numbers of unallocated ports obtained by subtracting the values corresponding to the new K, M, and N from any of the above from the total number of ports on the first port side and the second port side of the first layer switches 1*a,* and each side of the second layer switches 2*a* are set to $L_1$, $L_2$, and Ls.

In the case of a conventional switch configured by a Clos network (that is, of a Clos configuration), the efficiency of the switch is (N/M) if the configuration in which the input/output switch is connected to the maximum number of intermediate layer switches SW is taken as an example. On the other hand, in the network system 100*a,* the efficiency thereof is ((M/2+1+K)/(M+K)). ((M/(2+1+K))/(M+K)) is larger than (N/M)). Thus, the network system 100*a* can improve the efficiency of the use of the switch more than that of the conventional network system.

As described above, the first layer switches 1*a* and the second layer switches 2*a* are different from the first layer switches 1 and the second layer switches 2 in that, instead of adding the relay network directly from the first layer switches 1 or adding the ports and routes of the first layer switches 1-the second layer switches 2-the relay network to the switches configuring the Clos network, at least some of the ports and routes configuring the Clos network are directly diverted from the first layer switches 1*a* to the relay network or are diverted to the ports and routes of the first layer switches 1*a*-the second layer switches 2*a*-the relay network. Therefore, the network system 100*a* of the first embodiment can improve the efficiency of the use of the switch in a situation where the size of the switches cannot be increased.

Third Embodiment

Figure 5:
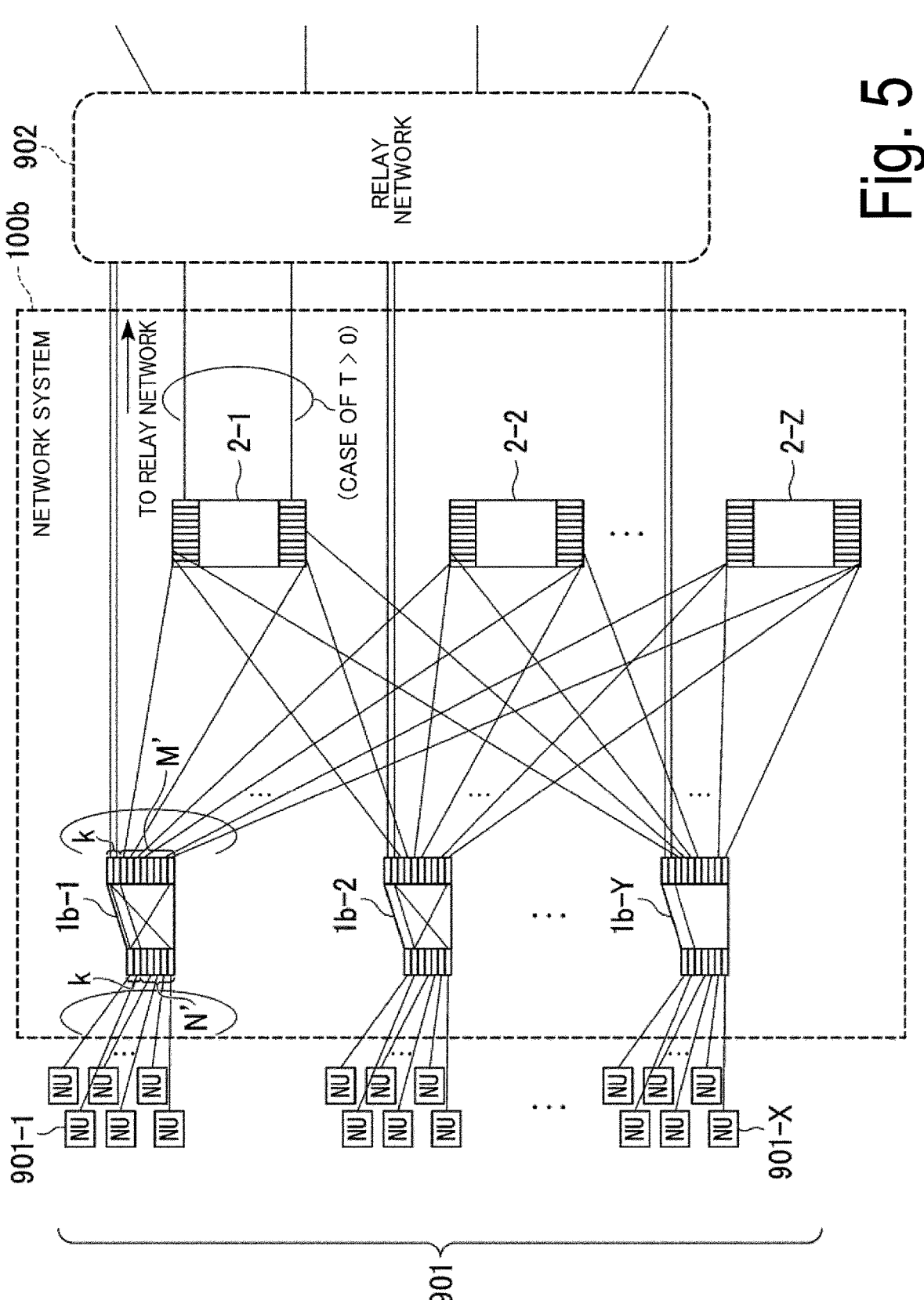
FIG. 5 is a diagram showing a configuration of a network system 100b according to a third embodiment.

FIG. 5 is a diagram showing a configuration of a network system 100*b* according to a third embodiment. The network system 100*b* includes a Clos network in part of its configuration.

The network system 100*b* is different from the network system 100 in that first layer switches 1*b*-1 to 1*b*-Y are provided instead of the first layer switches 1-1 to 1-Y. It is the same that at least one of K and T is non-negative.

Each of the first layer switches 1*b*-1 to 1*b*-Y is a switch. The switch is a network device having a plurality of first ports and a plurality of second ports, which outputs and inputs signals input to and output from the first ports from and to the second ports corresponding to the signals.

Each of the first layer switches 1*b*-1 to 1*b*-Y is connected to one or more subscriber terminals 901 via the first ports. In FIG. 5, a total of X subscriber terminals 901 of the subscriber terminals 901-1 to 901-X are connected to any one of the first layer switches 1*b*-1 to 1*b*-Y.

Hereinafter, the case where the subscriber terminal transmits data will be described. The subscriber terminal 901 transmits a communication signals to the network system 100*b.* The communication signals transmitted from the subscriber terminal 901 to the network system 100*b* are input to any one of the first ports of the first layer switches 1*b*-1 to 1*b*-Y.

Each of the first layer switches 1*b*-1 to 1*b*-Y is connected to the relay network 902 via part of the second port.

Each of the first layer switches 1*b*-1 to 1*b*-Y is connected to the second layer switches 2-1 to 2-Z via the second port which is not connected to the relay network 902. Therefore, at least some of the ports of the second layer switches 2-1 to 2-Z are connected to the first layer switches 1*b*-1 to 1*b*-Y.

Each of the first layer switches 1*b*-1 to 1*b*-Y has an internal transmission system like the first layer switch 1. The port of the transmission destination of the communication signals input to each port are changed by the control of the control device 4 in the same manner as the first layer switches 1.

Hereinafter, when each of the first layer switches 1*b*-1 to 1*b*-Y is not distinguished, it is referred to as the first layer switch 1*b.*

The first layer switches 1*b* are different from the first layer switches 1 in that the configuration of the ports provided are different.

The first layer switches 1*b* has R' first ports and R second ports. R' is a natural number and is smaller than R. R' is equal to (K+N+L3) and R is equal to (K+M+$L_2$). $L_1$ is the number of unallocated ports, and is a non-negative integer.

L3<$L_1$, and the network system 100*b* of the third embodiment has a smaller number of unused input ports than the network system 100 of the first embodiment in a situation where the size of the switch can be increased. That is, the network system 100*b* of the third embodiment can improve the efficiency of the use of the switches more than that of the network system 100 of the first embodiment.

Fourth Embodiment

Figure 6:
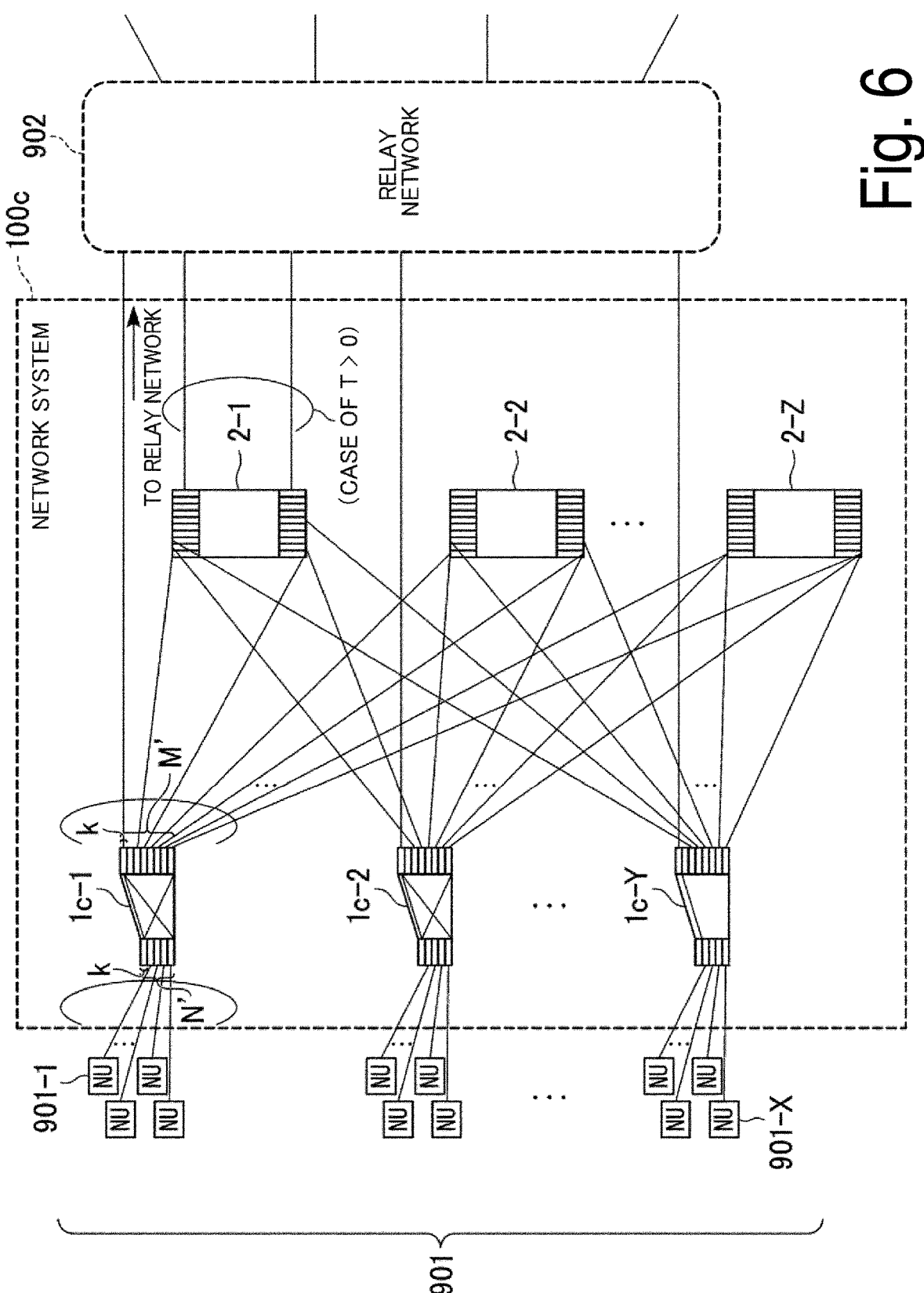
FIG. 6 is a diagram showing a configuration of a network system 100c according to a fourth embodiment.

FIG. 6 is a diagram showing an example of a configuration of a network system 100*c* according to a fourth embodiment. The network system 100*c* includes a Clos network in part of its configuration.

The network system 100*c* is different from the network system 100*b* in that first layer switches 1*c*-1 to 1*c*-Y are provided instead of the first layer switches 1*b*-1 to 1*b*-Y. It is the same that at least one of K and T is non-negative.

Each of the first layer switches 1*c*-1 to 1*c*-Y is a switch. The switch is a network device having a plurality of first ports and a plurality of second ports, which outputs and inputs a signal input to and output from the first port from and to the second port corresponding to the signal.

Each of the first layer switches 1*c*-1 to 1*c*-Y is connected to one or more subscriber terminals 901 via the first port. In FIG. 6, a total of X subscriber terminals 901 of the subscriber terminals 901-1 to 901-X are connected to any one of the first layer switches 1c-1 to 1c-Y.

Hereinafter, the case where the subscriber terminal transmits data will be described. The subscriber terminal 901 transmits a communication signal to the network system 100c, and the communication signal transmitted from the subscriber terminal 901 to the network system 100c is input to any one of the first ports of the first layer switches 1c-1 to 1c-Y.

Each of the first layer switches 1c-1 to 1c-Y is connected to the relay network 902 via part of the second ports.

Each of the first layer switches 1c-1 to 1c-Y is connected to the second layer switches 2-1 to 2-Z via the second port which is not connected to the relay network 902. Therefore, at least some of the ports of the second layer switches 2-1 to 2-Z are connected to the first layer switches 1c-1 to 1c-Y.

Each of the first layer switches 1c-1 to 1c-Y has an internal transmission system like the first layer switch 1. The ports of the transmission destination of the communication signals input to each port are changed by the control of the control device 4 in the same manner as the first layer switches 1.

Hereinafter, when each of the first layer switches 1c-1 to 1c-Y is not distinguished, it is referred to as the first layer switch 1c.

The first layer switches 1c are different from the first layer switches 1b in that the configuration of the ports provided are different. The first layer switches 1c has R' first ports and R second ports.

First, an ordinary Clos network is configured. Next, the case where K is non-negative and T is zero will be described. After the configuration, the first layer switch 1c selects K ports from the M second ports connected to the second layer switch as the ports to the relay network, and connects the selected ports to the relay network. The corresponding number of K ports are set from the first port. A value obtained by subtracting K from M is set as new M, and N corresponding to the new M is set as new N.

Alternatively, the first layer switches 1c select K ports from the first ports, and when the number obtained by subtracting K from R' is less than N, a value obtained by subtracting N from the amount that is less than N is set as new N, and M corresponding to the new N is set as new M, and when the number is equal to or more than N, N and M are used as they are.

Next, the case where K is zero and T is non-negative will be described. After an ordinary Clos network is configured, in some connections in the second layer switches 2a, instead of connecting the first layer switches 1a and the first layer switches 1a, each is connected to the relay network. In a case where there is room to add T ports connected to the relay network on one side of the port of the second layer switches 2a, they are added as they are, and in a case where there is not enough room to add T ports thereto, M is subtracted by that amount, the subtracted M is set as new M, N corresponding to the new M is set as new N, and T ports connected to the relay network are added to one side of the port of the second layer switches 2a.

In either case, when the value of M decreases, the value obtained by multiplying the number M of connections for each first layer switches 1a in the second layer switches 2a by the number Y of first layer switches 1a decreases, so that the number of first layer switches 1a may be increased by that amount.

Both K and T may be non-negative.

The numbers of unallocated ports obtained by subtracting the values corresponding to the new K, M, and N from any of the above from the total number of ports on the first port side and the second port side of the first layer switch 1a, and each side of the second layer switches 2a are set to $L_1$, $L_2$, and Ls.

$L3 < L_1$, and the network system 100c of the fourth embodiment has a smaller number of unused input ports than the network system 100b of the second embodiment in a situation where the size of the switch can be increased. That is, the network system 100c of the fourth embodiment can improve the efficiency of the use of the switch more than that of the network system 100a of the second embodiment.

As described above, the first layer switches 1c and the second layer switches 2c are different from the first layer switches 1b and the second layer switches 2b in that, instead of adding the relay network directly from the first layer switches 1c or adding the ports and routes of the first layer switches 1c-the second layer switches 2c-the relay network to the switches configuring the Clos network, at least some of the ports and routes configuring the Clos network are directly diverted from the first layer switches 1c to the relay network or are diverted to the ports and routes of the first layer switches 1c-the second layer switches 2c-the relay network. Therefore, the network system 100a of the first embodiment can improve the efficiency of the use of the switches in a situation where the size of the switches cannot be increased.

Fifth Embodiment

Figure 7:
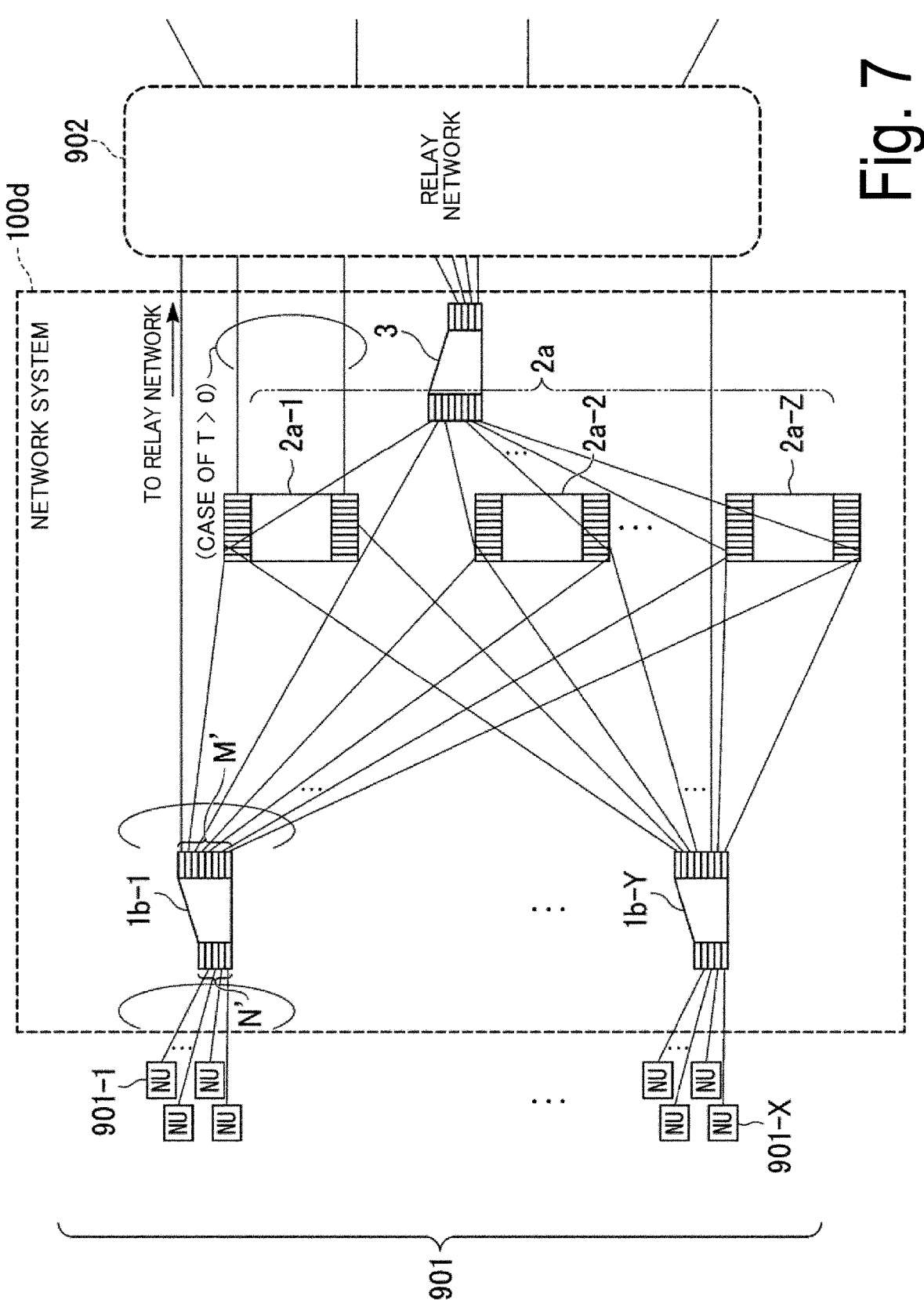
FIG. 7 is a diagram showing a configuration of a network system 100d according to a fifth embodiment.

FIG. 7 is a diagram showing an example of a configuration of a network system 100d according to a fifth embodiment. The network system 100d includes a Clos network in part of its configuration.

The network system 100d is different from the network systems 100b and 100c in that at least some of the first ports of part of the first layer switches are connected to the relay network instead of the subscriber device.

FIG. 7 shows a form in which all N ports of a first port of one first layer switches (hereinafter referred to as third layer switches 3) are connected to the relay network. Here, from the viewpoint of delivering a communication signals of a subscriber connected to a network system to a relay network, for first layer switches connecting all N ports of first ports to the relay network, K in the first layer switches shown in the first to fourth examples is zero, and thus the first layer switches are not connected to the ports directly connected to the relay network from the second layer switches having a value of T of non-zero.

Therefore, in the case of the first layer switches that connect some of the N ports of the first ports to the relay network and connects some of the N ports to the subscriber device, it may be connected to the relay network by providing a second port directly connected to the relay network for connecting from the first ports to which the subscriber device is connected, and the second layer switches having a value of T of non-zero may be connected to the ports directly connected to the relay network.

The network system 100d includes at least one or more first layer switches 1b connected to the subscriber device, and K in the first layer switches 1b is non-zero or the value of T in the second layer switches is non-zero.

Although the present embodiment has been shown based on the configurations of the third and fourth embodiments of the present application, it may be applied to the configurations of the first and second embodiments of the present application.

Similarly to the network system 100*b*, the network system 100*d* of the fifth embodiment configured in this way includes at least one or more first layer switches 1*b* connected to the subscriber device, and K in the first layer switches 1*b* is non-zero or the value of T of the second layer switches is non-zero. Thus, similarly to the network system 100*b*, the network system 100*d* can improve the efficiency of the use of the switches more than that of the conventional network system.

Modification Example

The network system 100 of the first embodiment may be implemented as a single device (network device). The network system 100*a* of the second embodiment may be implemented as a single device (network device). The network system 100*b* of the third embodiment may be implemented as a single device (network device). The network system 100*c* of the fourth embodiment may be implemented as a single device (network device). The network system 100*d* of the fifth embodiment may be implemented as a single device (network device).

The network system 100*d* of the fifth embodiment may include the first layer switches 1 in part or the whole instead of the first layer switches 1*b*. The network system 100*d* of the fifth embodiment may include the first layer switch 1*a* in part or the whole instead of the first layer switches 1*b*. The network system 100*d* of the fifth embodiment may include the first layer switches 1*c* in part or the whole instead of the first layer switches 1*b*.

In the fifth embodiment, R' of the third layer switches 3 have been described as being smaller than R. However, when the network system 100*d* includes the first layer switches 1 or 1*a* instead of the first layer switches 1*b*, R' of the third layer switch 3 may have the same value as R. That is, the network system 100 or 100*a* may include the second layer switches 2*a* instead of the second layer switches 2, and in such a case, the network system 100 or 100*a* may include a second layer switches having the same number of input ports and the same number of output ports.

The network system 100 of the first embodiment may include the first layer switch 1*a* in part or the whole instead of the first layer switches 1. The network system 100 of the first embodiment may include the first layer switches 1*b* in part or the whole instead of the first layer switches 1. The network system 100 of the first embodiment may include the first layer switches 1*c* in part or the whole instead of the first layer switches 1.

The network system 100*a* of the second embodiment may include the first layer switches 1 in part or the whole instead of the first layer switches 1*a*. The network system 100*a* of the second embodiment may include the first layer switches 1*b* in part or the whole instead of the first layer switch 1*a*. The network system 100*a* of the second embodiment may include the first layer switches 1*c* in part or the whole instead of the first layer switches 1*a*.

The network system 100*b* of the third embodiment may include the first layer switches 1 in part or the whole instead of the first layer switches 1*b*. The network system 100*b* of the third embodiment may include the first layer switches 1*a* in part or the whole instead of the first layer switches 1*b*. The network system 100*b* of the third embodiment may include the first layer switches 1*c* in part or the whole instead of the first layer switches 1*b*.

The network system 100*c* of the fourth embodiment may include the first layer switches 1 in part or the whole instead of the first layer switches 1*c*. The network system 100*c* of the fourth embodiment may include the first layer switches 1*a* in part or the whole instead of the first layer switches 1*c*. The network system 100*c* of the fourth embodiment may include the first layer switch 1*b* in part or the whole instead of the first layer switches 1*c*.

The network system 100 of the first embodiment may include some or all first layer switches 1 that do not have second ports connected to the relay network and the first ports connected to the second ports (that is, K=0) instead of the first layer switches 1.

The network system 100*a* of the second embodiment may include some or all first layer switches 1*a* that does not have second ports connected to the relay network and the first ports connected to the second ports (that is, K=0) instead of the first layer switches 1*a*.

The network system 100*b* of the third embodiment may include some or all first layer switches 1*b* that does not have second ports connected to the relay network and the first port connected to the second port (that is, K=0) instead of the first layer switches 1*b*.

The network system 100*c* of the fourth embodiment may include some or all first layer switches 1*c* that does not have second ports connected to the relay network and the first port connected to the second port (that is, K=0) instead of the first layer switches 1*c*.

The network system 100*d* of the fifth embodiment may include some or all first layer switches 1*b* that does not have second ports connected to the relay network and the first port connected to the second port (that is, K=0) whole instead of the first layer switches 1*b*.

Each of the first layer switches 1, 1*a*, 1*b*, and 1*c* may be implemented by using a plurality of intonation processing devices that are communicably connected via a network. In this case, each functional unit provided in each of the first layer switches 1, 1*a*, 1*b*, and 1*c* may be distributed and mounted in a plurality of information processing devices.

The third layer switches 3 may be implemented by using a plurality of information processing devices that are communicably connected via a network. In this case, each functional unit provided in the third layer switches 3 may be distributed and mounted in a plurality of information processing devices.

Each of the second layer switches 2 and 2*a* may be implemented by using a plurality of information processing devices that are communicably connected via a network. In this case, each functional unit provided in each of the second layer switches 2 and 2*a* may be distributed and mounted in a plurality of information processing devices.

Some of the first layer switches 1 may not have a port connected to the relay network 902 without passing through the second layer switches 2. Some of the first layer switches 1*a* may not have a port connected to the relay network 902 without passing through the second layer switches 2. Some of the first layer switches 1*b* may not have a port connected to the relay network 902 without passing through the second layer switches 2. Some of the first layer switches 1*c* may not have a port connected to the relay network 902 without passing through the second layer switches 2.

In FIG. 1, although all the ports of the second layer switches 2 are connected to the first layer switches 1, all the ports of the second layer switches 2 need not be connected to the first layer switches 1. Some of the ports of the second layer switch 2 may be connected to the relay network 902.

The control device 4 may be provided in any one of the first layer switches 1, the second layer switches 2, and the third layer switches 3, or may be provided in a plurality of distributed states capable of communicating with each other.

In the case of being provided in a distributed manner, a function equivalent to that of one control device 4 is realized by cooperating with each other.

Hitherto, the first layer switches 1, 1*a*, 1*b*, and 1*c*, the second layer switches 2 and 2*a*, and the third layer switches 3 have been illustrated and described by using a lattice shape N*M matrix switch. However, the configurations of the first layer switches 1, 1*a*, 1*b*, and 1*c*, the second layer switches 2 and 2*a*, and the third layer switches 3 may be other configurations. Other configurations may be, for example, a triangular lattice type, a planar type, a torus type, and a Banyan network may be used. In the case of the optical switches, any configuration of a space division type, a time division, a wavelength division, and a free space type may be used.

The subscriber Port connection may be a single network unit (NU), or may be on the Drop side of a star-type passive double star (PDS), a bus-type, or a ring-type add drop multiplexer (ADM). The subscriber Port connection may be part of the subscriber ring by a single station device, or may be connected to the subscriber ring once by a plurality of station side devices to foam a ring via a station side device or a relay network. The station device itself may be a larger virtual station device by ring or mesh connection. The station device or the virtual station device may be connected to the ground station device by a mesh (in the case of four grounds, physical or logical connection to three grounds). The station device or the virtual station device may be connected in a ring configuration (in the case of a single ring, connection to two counterclockwise and clockwise grounds, and in the case of a multi-ring, connection to the ground according to the ring configuration) to foam a network, for example, an optical full mesh network.

return transmission lines from the first ports to other first ports or from the second ports to other second ports of the first switches may be connected, inputs to and output from the ports may be multiplexed or demultiplexed by a multiplexer/demultiplexer or the like, or the same switches may be repeatedly passed through by cross-multiplication. A device for performing OE-to-EO conversion or division multiplexing may be used in the middle of the cross-multiplication.

An optical node called a photonic gateway (PhGW) may be used for connecting nodes in an optical full mesh network, an access surface, a local full mesh surface, relaying by minimizing electric processing such as packet conversion and multiplex-switch control, and providing an optical path at an end-to-end for each service.

In the case of the PhGW, wavelength management control may be provided, or as a method of wavelength control instruction, a management control signal may be superimposed as an auxiliary management and control channel (AMCC) on a low frequency band which does not interfere with a user signal and notified of at the same wavelength, or user data may be notified of in a frame as a payload. The switching control may be performed before the connections of the first layer switches/taps at the first ports of the first layer switches/outputs of the second ports of the first layer switches/taps at the second ports of the first layer switches/before the connections of the second switches/before the connections of the second switches/taps at the input of the second layer switches/taps at the outputs of the second layer switches/outside the station device/on the relay network side. The switching may be performed in units of paths, or may be pertained in a combination of a path and a wavelength, a frequency, a code, a mode, polarization, and the like.

Here, a case will be described in which the ports are empty from the first layer switches 1 to the relay network 902 due to failure in the accommodation design and the ports from the subscriber of other first layer switches 1 to the relay network 902 is insufficient. In such a case, by changing the system to a system satisfying a first improvement condition and a second improvement condition, deviation of the port to the relay network 902 between the first layer switches 1 is improved.

The first improvement condition is a condition that a switch described in NPL 1 is used instead of the first layer switches 1*b* or 1*c* in the network system 100*b*, 100*c*, or 100*d*. The switch described in NPL 1 is specifically a switch of a combination of asymmetric virtual switches. The switch of the combination of asymmetric virtual switches described in NPL 1 functions as a symmetric switch. The second improvement condition is that communication signals are propagated from the first layer switches 1*b* or 1*c* to the second layer switches 2 or 2*a*, and are propagated to the first layer switches 1*b* or 1*c*, and then are propagated to the relay network 902.

When the network systems 100*b*, 100*c*, or 100*d* satisfy the first improvement condition and the second improvement condition, the same number of connection as that of the related art is required for the use port, but the effect that the deviation of the port to the relay network 902 between the first layer switches 1 is improved is achieved. Note that the number of connections is three.

The first layer switch 1 is an example of the first layer switch. The second layer switch 2 is an example of the second layer switch. The first port of the first layer switch 1 is an example of the first port of the first layer switch. The second port of the first layer switch 1 is an example of the second port of the first layer switch. The second layer switch 2 is an example of the second layer switch. The port of the second layer switch 2 is an example of the port of the second layer switch. The control device 4 is an example of the control unit. Each of the network systems 100, 100*a*, 100*b*, 100*c*, and 100*d* is an example of the switch configuration.

As described above, the control device 4 performs the route determination processing. This means that the control device 4 performs at least one of first determination processing and second determination processing. The first determination processing is processing for determining a second port of an input/output destination of a signal input to and output from a first port of the first layer switch 1. The second determination processing is processing for determining a port of an input/output destination of a signal input to and output from a port of the second layer switch 21.

All or some of the functions of each of the first layer switches 1, 1*a*, 1*b*, and 1*c*, each of the second layer switches 2 and 2*a*, and the third layer switch 3 may be realized by using hardware such as an application specific integrated circuit (ASIC), a programmable logic device (PLD), or a field programmable gate array (FPGA). The program may be recorded on a computer-readable recording medium. The computer- readable recording medium is, for example, a portable medium such as a flexible disk, a magneto-optical disk, a ROM, or a CD-ROM, or a storage device such as a hard disk built in a computer system. The program may be transmitted via an electrical communication line.

Although the embodiments of the present invention have been described in detail with reference to the drawings, specific configurations are not limited to these embodiments, and designs and the like within a range that does not deviating from the gist of the present invention are also included.

REFERENCE SIGNS LIST

100, 100*a,* 100*b,* 100*c,* 100*d* Network system
1, 1*a,* 1*b,* 1*c* First layer switch
2, 2*a* Second layer switch
3 Third layer switch
4 Control device
40 Calculation unit
41 Circuit control unit
42 Storage unit
91 Processor
92 Memory

The invention claimed is:

1. A switch configuration comprising:

one or more first layer switches each having first ports and second ports; and one or more second layer switches each having at least one port connected to a first layer switch, wherein ports of a second layer switch connected to a first layer switch is connected to other ports of the second layer switch connected to the first layer switch, and at least one of second ports connected to a first port in one of the first layer switches or one of ports of one of the second layer switches connected to a first port through a second port of one of the first layer switch is connected to a relay network.

2. A network system comprising:

the switch configuration according to claim 1, processor; and a storage medium having computer program instructions stored thereon, wherein the computer program instruction, when executed by the processor, perform processing of:

performing at least one of determination of second ports of the same first layer switch as input/output destinations of signals input to and output from first ports of the first layer switch or determination of ports of the same second layer switch as input/output destinations of signals input to and output from other ports of the second layer switch.

3. A control method that is performed by a network system including one or more first layer switches each having first ports and second ports, one or more second layer switches each having at least one port connected to a first layer switch, and a processor; and a storage medium having computer program instructions stored thereon, wherein the computer program instruction, when executed by the processor, perform processing of:

performing at least one of determination of second ports of the same first layer switch as input/output destinations of signals input to and output from first ports of a first layer switch or determination of ports of the same second layer switch as input/output destinations of signals input to and output from other ports of a second layer switch, in which ports of the second layer switch connected to the first layer switch is connected to other ports of the second layer switch connected to the first layer switch, and at least one of second ports connected to first ports of one of the first layer switches or one of ports of the second layer switch connected to a first port through a second port of one of the first layer switches is connected to a relay network, the method comprising:

performing at least one of determination of second ports of the same first layer switch as input/output destinations of a signal input to and output from first ports of the first layer switch or determination of ports of the same second layer switch as input/output destinations of signals input to and output from ports of the second layer switch.

4. The switch configuration according to claim 1, wherein a number of the first ports is smaller than a number of the second ports.

5. The switch configuration according to claim 1, further comprising a third layer switch that is a first layer switch in which some of the first ports are connected to a relay network.

* * * * *